(12) United States Patent
Ho et al.

(10) Patent No.: US 10,551,881 B2
(45) Date of Patent: Feb. 4, 2020

(54) THERMAL MANAGEMENT HINGE

(71) Applicant: Microsoft Technology Licensing, LLC, Redmond, WA (US)

(72) Inventors: Chau Van Ho, Des Moines, WA (US); Shalini Majumdar, Redmond, WA (US); Bo Dan, Redmond, WA (US); Bharath Nagendran, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/462,451

(22) Filed: Mar. 17, 2017

(65) Prior Publication Data

US 2018/0267578 A1    Sep. 20, 2018

(51) Int. Cl.
*G06F 1/16*     (2006.01)
*F28F 27/00*    (2006.01)
*G06F 1/20*     (2006.01)
*F28F 13/00*    (2006.01)

(52) U.S. Cl.
CPC ............ *G06F 1/1681* (2013.01); *F28F 27/00* (2013.01); *G06F 1/203* (2013.01); *G06F 1/206* (2013.01); *F28F 2013/006* (2013.01); *F28F 2280/105* (2013.01)

(58) Field of Classification Search
CPC .............. F28F 2280/105; G06F 1/1681; G06F 1/1616; G06F 1/203; E05D 7/00; H04M 1/0216
USPC ..................................................... 361/679.28
See application file for complete search history.

(56) References Cited

U.S. PATENT DOCUMENTS

| 3,268,703 A * | 8/1966 | Schoppman ........... B23K 1/002 |
| | | 219/615 |
| 5,621,613 A | 4/1997 | Haley et al. |
| 6,421,531 B1 * | 7/2002 | Dehan .................... H01R 35/04 |
| | | 379/433.13 |
| 6,449,149 B1 * | 9/2002 | Ohashi ................... G06F 1/203 |
| | | 165/104.33 |
| 7,269,005 B2 | 9/2007 | Pokharna et al. |
| 7,969,739 B2 * | 6/2011 | Tsunoda .................. G06F 1/203 |
| | | 165/185 |
| 8,355,248 B2 | 1/2013 | Nishi |
| 8,760,864 B2 | 6/2014 | Chiang |

(Continued)

FOREIGN PATENT DOCUMENTS

CN    104571398 A    4/2015
WO    9843033 A1    10/1998

OTHER PUBLICATIONS

Ellisaurus, "Sony VAIO Duo 13 Hybrid Laptop/Tablet Review", https://fabulousellis.wordpress.com/2015/12/18/sony-vaio-duo-13-hybrid-laptoptablet-irl-review/, Published on: Dec. 18, 2015, 27 pages.

(Continued)

*Primary Examiner* — Mukundbhai G Patel
(74) *Attorney, Agent, or Firm* — Holzer Patel Drennan

(57) ABSTRACT

The disclosed technology includes a thermal management hinge connecting at least two hinged components of a computing device. The thermal management hinge has at least two different thermal orientations for managing thermal conditions within each of the hinged components. For example, the thermal management hinge may have a thermally conductive orientation and the thermally insulating orientation.

18 Claims, 10 Drawing Sheets

(56) References Cited

U.S. PATENT DOCUMENTS

| | | |
|---|---|---|
| 8,786,581 B2 | 7/2014 | Ishii |
| 9,007,760 B2 | 4/2015 | Degner et al. |
| 9,013,867 B2 | 4/2015 | Becze et al. |
| 9,148,979 B2 | 9/2015 | Chiriac et al. |
| 9,151,079 B2* | 10/2015 | Webb .................... H02N 2/183 |
| 9,182,794 B2 | 11/2015 | Rivera et al. |
| 9,268,377 B2 | 2/2016 | MacDonald et al. |
| 2002/0051339 A1 | 5/2002 | Ohashi et al. |
| 2014/0052965 A1 | 2/2014 | Sarel |
| 2014/0098489 A1 | 4/2014 | Chiriac et al. |
| 2014/0220790 A1* | 8/2014 | Lee .................... E05D 11/0081 |
| | | 439/31 |
| 2016/0048363 A1 | 2/2016 | North et al. |

OTHER PUBLICATIONS

"90oC Thermal Circuit Breaker/Switch", https://www.jaycar.com.au/90oc-thermal-circuit-breaker-switch/p/ST3825, Retrieved on: Dec. 2, 2016, 3 pages.

"International Search Report and Written Opinion Issued in PCT Application No. PCT/US18/021901", dated Aug. 9, 2018, 17 Pages.

\* cited by examiner

THERMAL MANAGEMENT HINGE

BACKGROUND

Computing devices encompass a variety of devices that can be programmed to carry out one or more specific sets of arithmetic and/or logical operations, with or without user input. Some computing devices utilize one or more hinges to pivotally connect two or more components of the computing device.

For example, laptop computers utilize one or more hinges to connect a display component with a keyboard component of the laptop computer. Other computing devices may have a similar configuration with two components connected via one or more hinges. Being an integral design element, hinges for laptop computers or other computing devices are often either designed to conduct heat from one component to the other component, or to thermally insulate one component from the other component as a part of an overall thermal solution for the computing device.

SUMMARY

Implementations described and claimed herein address the foregoing by providing a thermal management hinge that includes an outer pin incorporating a thermally conductive section and a thermally insulating section and a thermally conductive inner pin. The inner pin selectively rotates within the outer pin to physically contact different areas of the thermally conductive and thermally insulating sections of the outer pin depending on a rotational orientation of the inner pin with respect to the outer pin.

Implementations described and claimed herein address the foregoing by further providing a method of using a thermal management hinge of a computing device. The method includes detecting an operating condition of the computing device, comparing the operating condition with a list of preselected scenarios, and changing a thermal orientation of the thermal management hinge when the operating condition matches a preselected scenario from the list of preselected scenarios.

Implementations described and claimed herein address the foregoing by further still providing a computing device including a first hinged component, a second hinged component, and a thermal management hinge pivotally connecting the first hinged component to the second hinged component. The thermal management hinge includes an outer pin incorporating a thermally conductive section and a thermally insulating section, a first thermally conductive knuckle in thermally conductive contact with the outer pin and the first hinged component, and a second thermally conductive knuckle in thermally conductive contact with the outer pin and the second hinged component. The second knuckle is thermally insulated from the first knuckle. The thermal management hinge further includes a thermally conductive inner pin that selectively rotates within the outer pin to physically contact different areas of the thermally conductive and thermally insulating sections of the outer pin depending on a rotational orientation of the inner pin with respect to the outer pin.

Other implementations are also described and recited herein. This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter.

BRIEF DESCRIPTIONS OF THE DRAWINGS

Figure 7A:
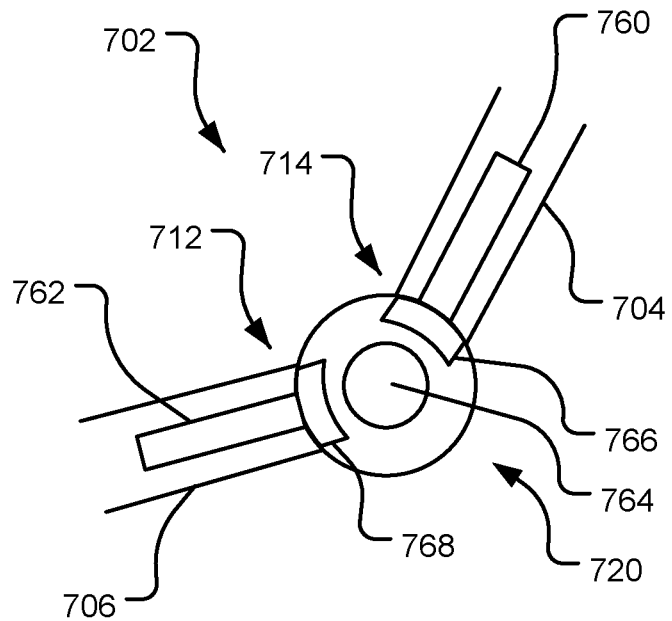

FIG. 7A includes a sectional view of a fourth example thermal management hinge in a thermal insulation orientation.

Figure 7B:
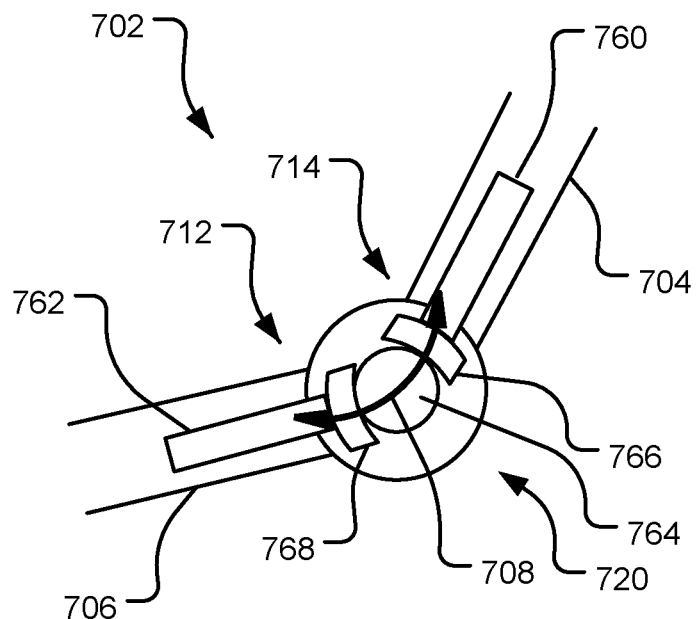

FIG. 7B includes a sectional view of the thermal management hinge of FIG. 7A in a thermal conduction orientation.

Figure 8:
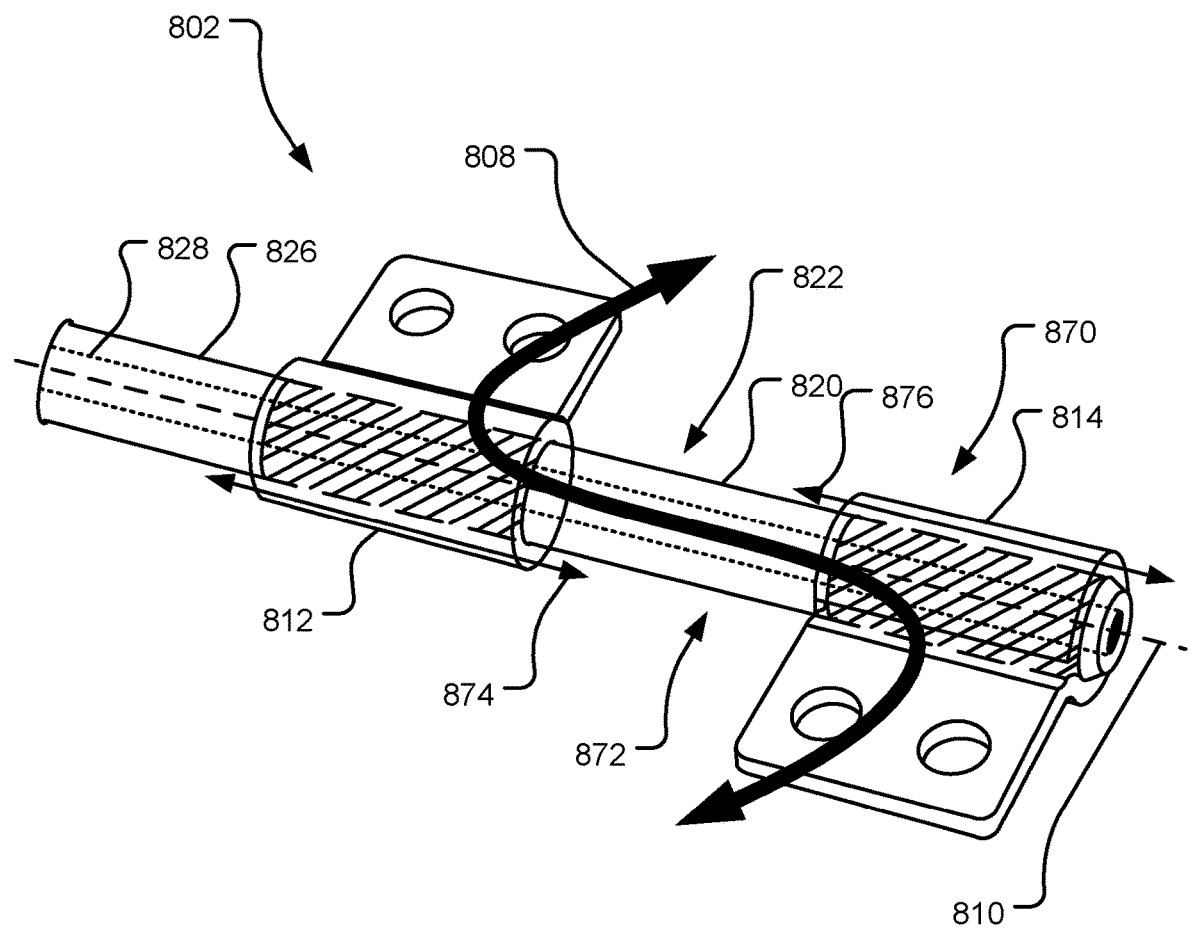

FIG. 8 is a perspective view of a fifth example thermal management hinge.

Figure 9:
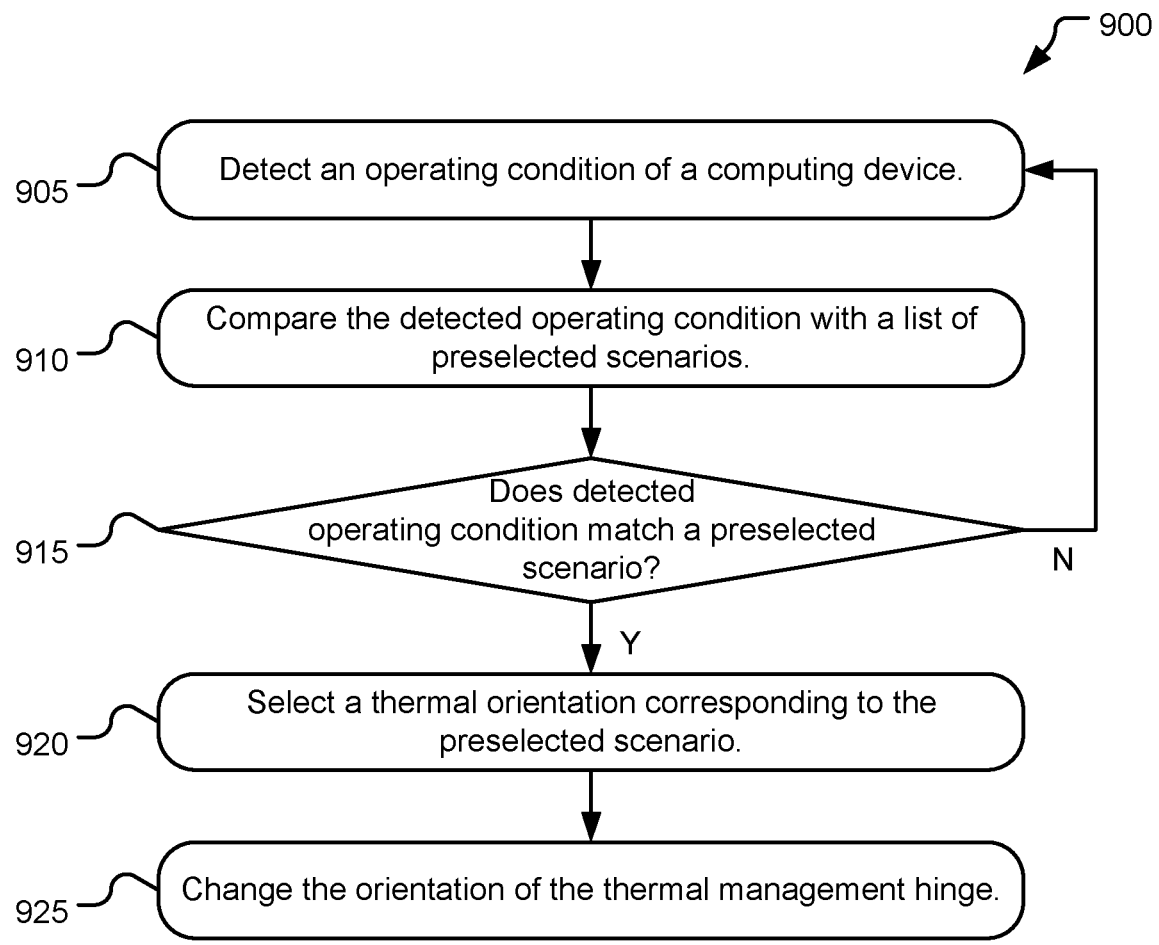

FIG. 9 illustrates example operations for using a thermal management hinge.

Figure 10:
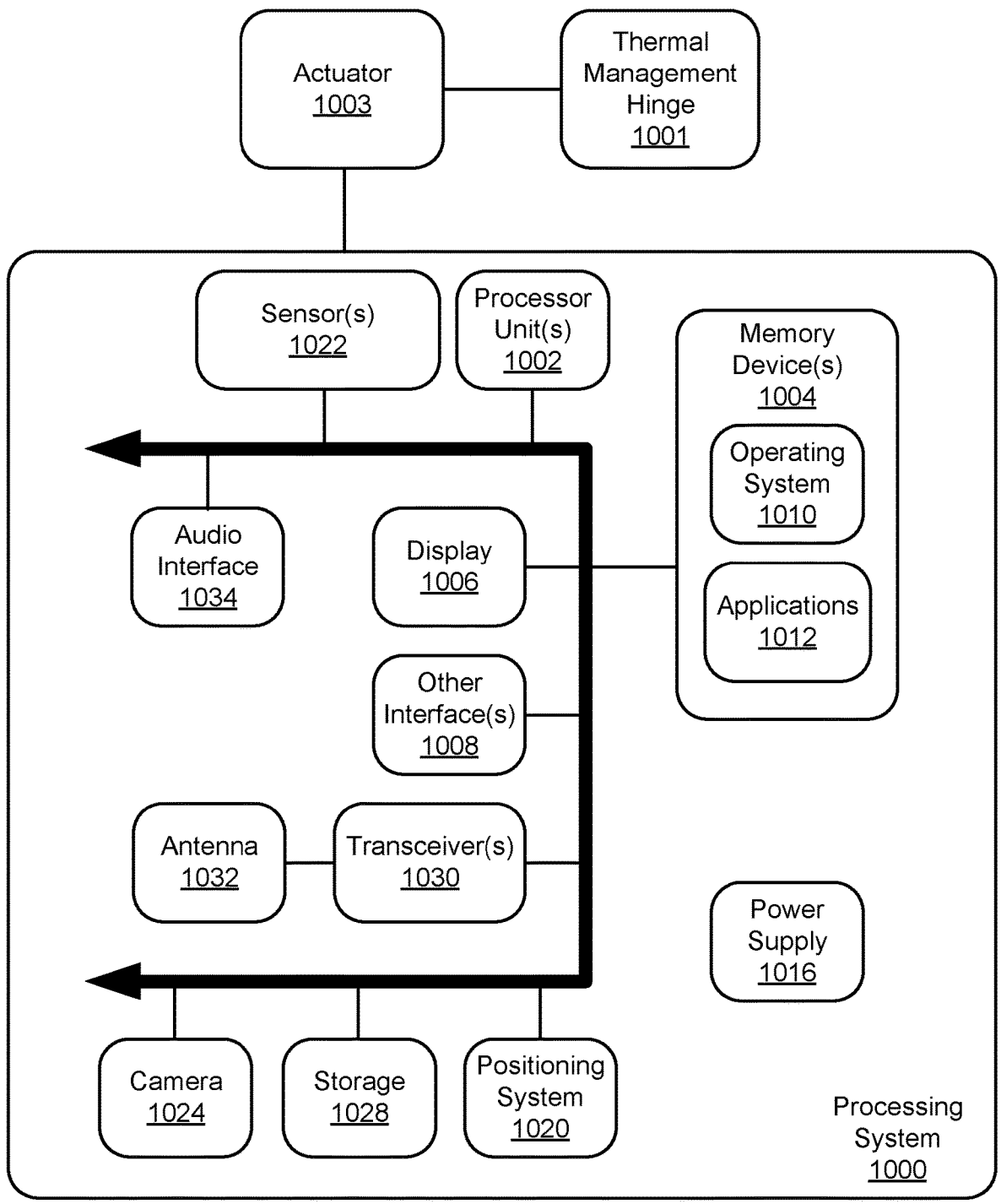

FIG. 10 illustrates an example processing system for use in controlling a thermal management hinge.

DETAILED DESCRIPTIONS

Computing devices generate heat during operation. Heat is dissipated out of the devices to make sure all component temperatures meet specification. The maximum cooling capability of a computing device is often determined once a thermal design for the computing device is fixed. For a passive cooling device, maximum cooling capability is dependent on the heat that can be dissipated through natural convection and radiation, which in turn is dependent on its geometry, temperature limits, operating modes (e.g., vertical-in-air and flat-on-table), and surface finish (emissivity). For an active cooling device, in addition to the heat dissipated though natural convection and radiation, the maximum cooling capability is dependent on the heat dissipated via an induced airflow through the computing device, which is driven by air movers (e.g., a fan or blower).

For a computing device with multiple hinged components, each hinged component may have its own cooling capability, and the cooling capability may be limited by design (e.g., thermal solutions and temperature specifications). When device components are connected, the device work mode may change. The thermal design on each device component could be over-designed or under-designed. The thermal management hinges disclosed herein may balance cooling capacity of each device component to maximize the system performance or optimize the user experience in different user conditions.

One example computing device is a 2-in-1 device (e.g., Microsoft SurfacePro). On the display component, the thermal design could be passive cooling or active cooling with a small fan, which may be enough for operating independently. When a keyboard component is attached to the display component, the keyboard component may not generate much heat, but provides additional cooling capacity. For example, if the keyboard component is made of metal, the thermal management hinge can transfer heat to the keyboard component, which allows for a power increase (and therefore performance increase) on the display component, or a fan speed decrease (noise reduction for better user experience) on display component. If the keyboard component has fan(s), it can bring even more cooling capability for the entire computing device. In other implementations, the computing device may have more than two hinged components. If one device component has more cooling capability than its own demands, and another device component demands extra cooling, the thermal management hinge may be used to balance the cooling capabilities and demands of all the hinged device components.

In other words, while an overall computing device design will likely accommodate either a thermally conductive hinge or a thermally insulating hinge, there may be instances where it would be desirable for a normally thermally conductive hinge to thermally insulate one component from another component of a computing device. Similarly, there may be instances where it would be desirable for a normally thermally insulating hinge to conduct heat from one component to another component of the computing device. Disclosed herein are thermal management hinges and methods of operating the thermal management hinges to selectively achieve one of at least two distinct thermal conduction modes.

Figure 1A:
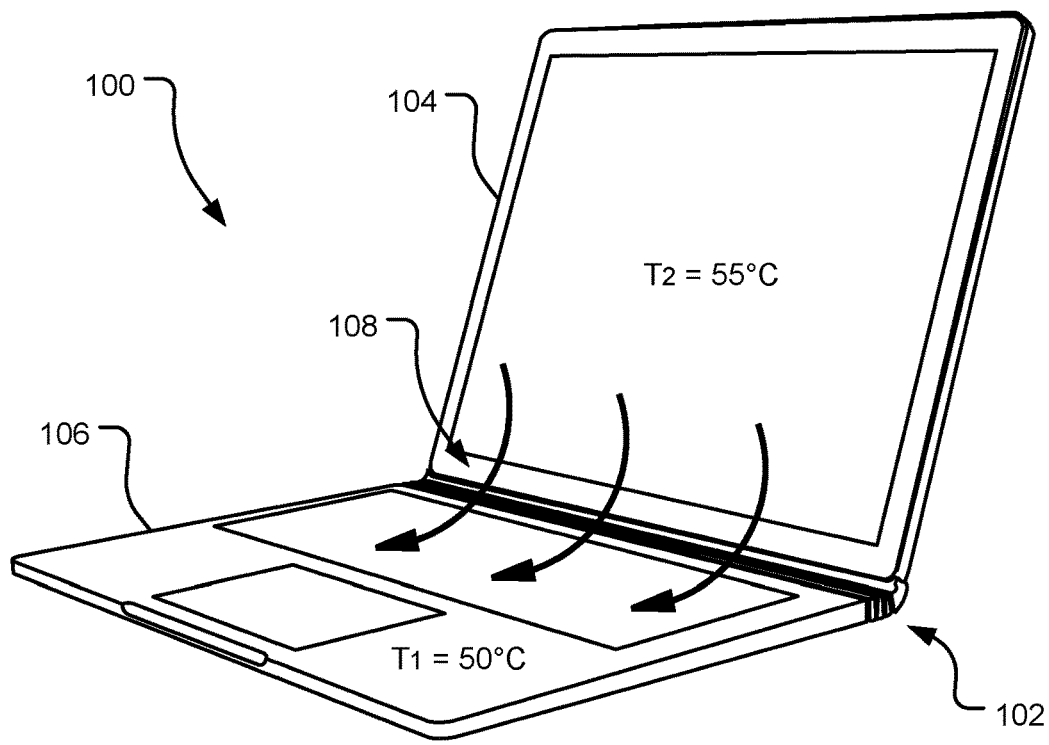
FIG. 1A is a perspective view of a first example computing device incorporating a thermal management hinge operating in a thermal conduction mode.

FIG. 1A is a perspective view of an example computing device 100 incorporating a thermal management hinge 102 operating in a thermal conduction mode. The device 100 is depicted as a laptop computer, however, the thermal management hinge 102 may be similarly incorporated within a variety of computing devices, including mobile computing devices and desktop computing devices.

The hinge 102 pivotally connects a display component 104 with a keyboard component 106 of the device 100. As a result, a user may position the display component 104 at a variety of angles with respect to the keyboard component 106 to achieve a desired viewing angle to the display component 104, or for other user considerations. Further, the display component 104 may be separable from the keyboard component 106 so long as the display component 104 is in thermally conductive contact with the hinge 102 when it is connected to the keyboard component 106. While the display component 104 and the keyboard component 106 are illustrated, and discussed in detail herein, the computing device may include any two or more hinged components.

Figure 2:
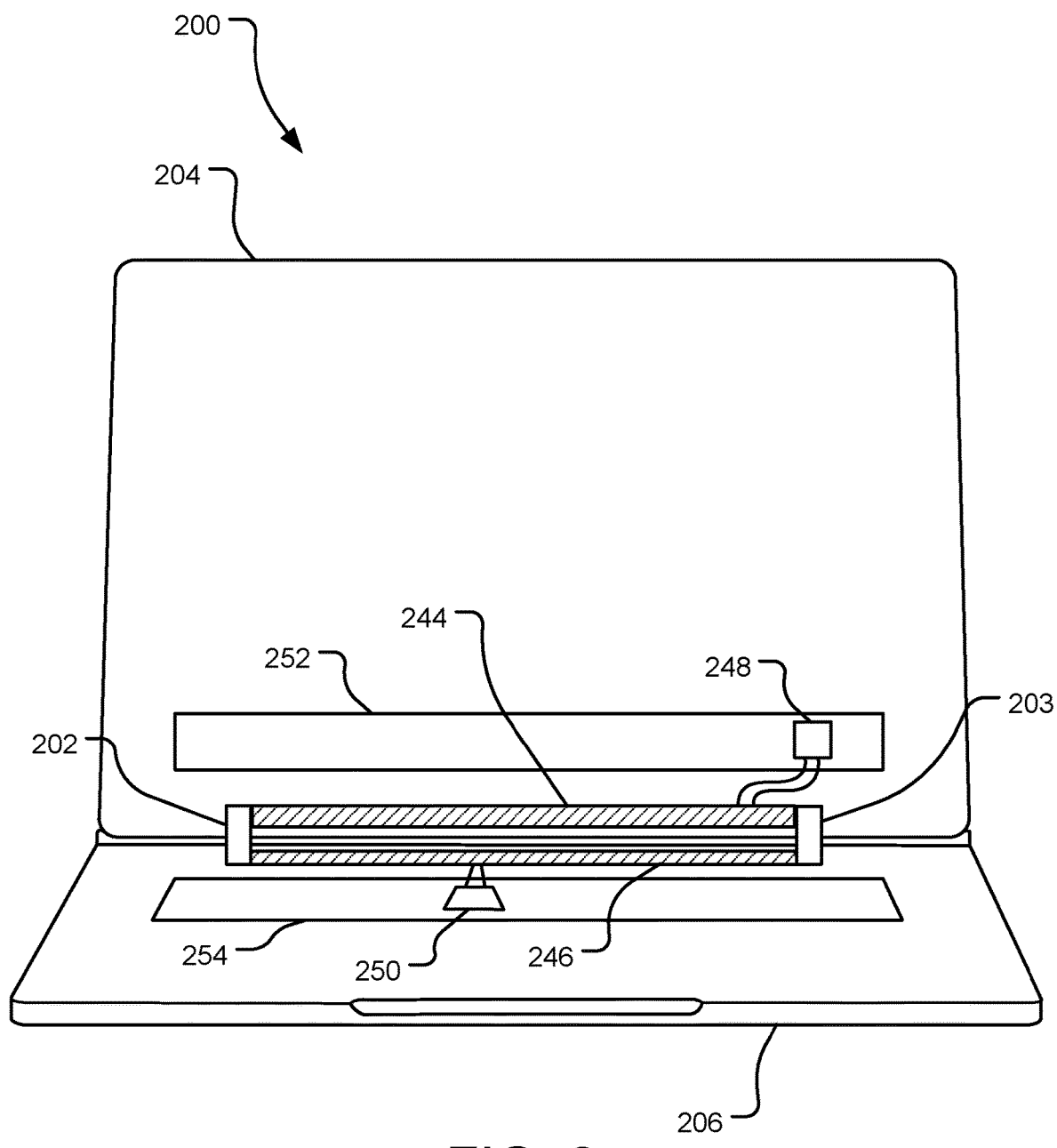
FIG. 2 is a perspective view of an example computing device incorporating separate, but selectively linked thermal solutions for individual hinged components of the computing device.
Figure 3:
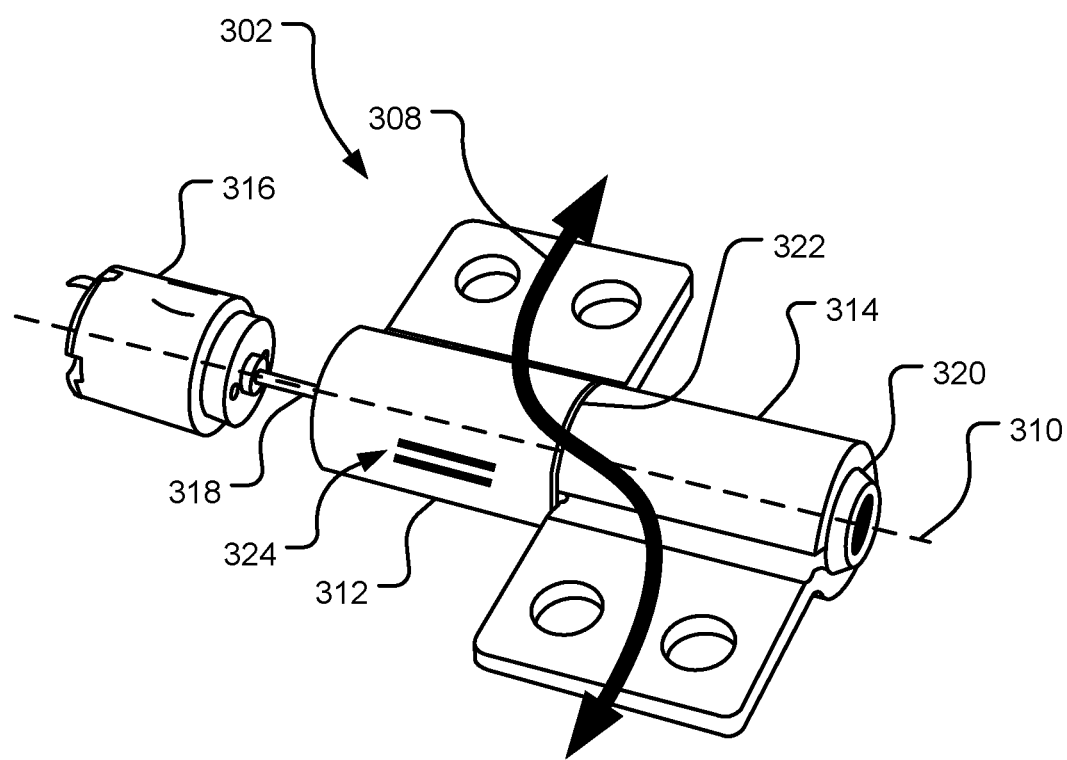
FIG. 3 is a perspective view of a first example thermal management hinge.

The hinge 102 may take a variety of specific forms, and may incorporate some aspects of a barrel hinge (see hinge 302 of FIG. 3). The hinge 102 may also be one continuous hinge that runs across substantially an entire width of the device 100 (as shown), or one or more discrete hinges placed between the display component 104 and the keyboard component 106 (see e.g., hinges 202, 203 of FIG. 2).

The hinge 102 has at least two thermal operating modes (e.g., a thermal conduction mode and a thermal insulation mode). In FIG. 1A, the hinge 102 is depicted in the thermal conduction mode, as illustrated by thermal transfer arrows 108. The thermal transfer arrows 108 illustrate thermal conduction from the relatively higher temperature display component 104 (e.g., operating at $T_2=55°$ C.) to the relatively lower temperature keyboard component 106 (e.g., operating at $T_1=50°$ C.) via the hinge 102.

Each of the keyboard component 106 and the display component 104 may generate heat (e.g., by charging a battery or operating electronic components therein) and dissipate heat (e.g., by operating a heat sink or convective cooling fan). Over time, a temperature of each component 104, 106 will approach a steady state. The hinge 102 operating in thermal conduction mode allows heat conduction between the display component 104 and the keyboard component 106. Thus, over time, the entire device 100 will move toward a new steady state thermal condition.

In an implementation where a temperature of the display component 104 is higher than a temperature of the keyboard component 106, the device 100 may reach a point of equilibrium with a constant heat conduction via the hinge 102 maintaining the keyboard component 106 at a constant $T_1$ and the display component 104 at a constant $T_2$. In an implementation where a temperature of the keyboard component 106 is equal to a temperature of the display component 104, there will be no heat conduction via the hinge 102 between the keyboard component 106 and the display component 104. In an implementation where a temperature of the keyboard component 106 is higher than a temperature of the display component 104, the heat conduction direction via the hinge 102 will reverse.

Figure 1B:
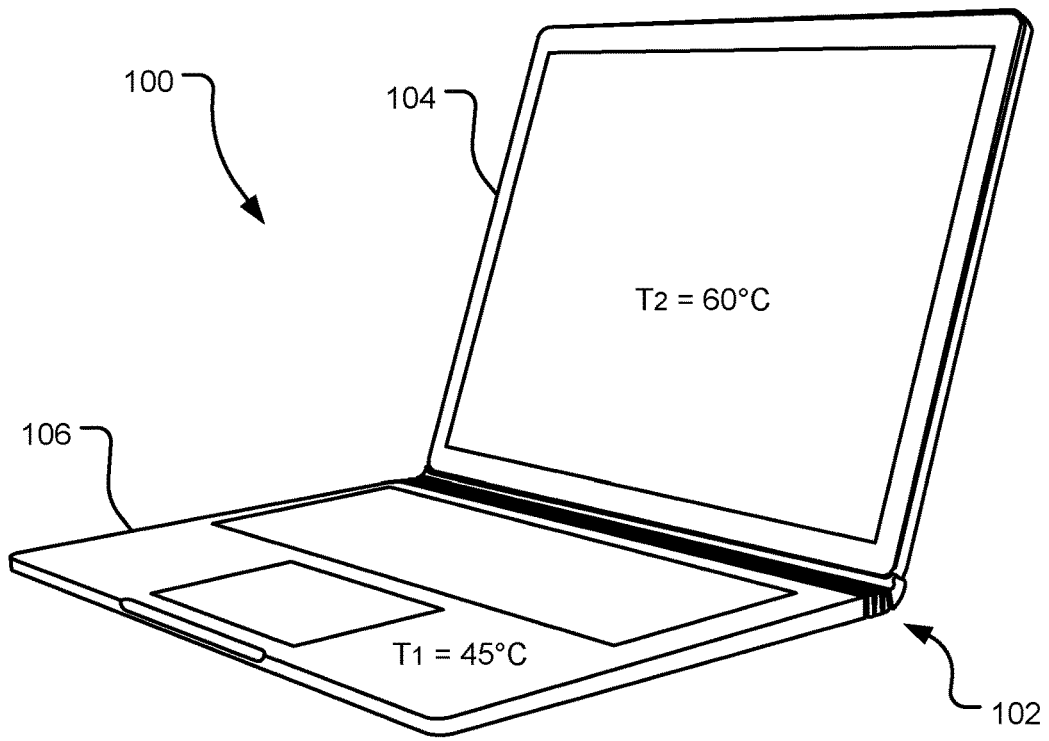
FIG. 1B is a perspective view of the computing device of FIG. 1A, incorporating the thermal management hinge operating in a thermal insulation mode.

FIG. 1B is a perspective view of the computing device 100 of FIG. 1A, incorporating the thermal management hinge 102 operating in a thermal insulation mode. In the thermal insulation mode, little to no heat is transferred between the display component 104 and the keyboard component 106, even in the presence of a significant temperature disparity between the display component 104 and the keyboard component 106.

In the relative absence of thermal transfer between the relatively higher temperature display component 104 (e.g., operating at $T_1=60°$ C.) to the relatively lower temperature keyboard component 106 (e.g., operating at $T_2=45°$ C.) via the hinge 102, the display component 104 operates at a higher $T_2$ and the keyboard component 106 operates at a lower $T_1$ than that depicted in FIG. 1A.

In some implementations, the hinge 102 includes more than the two aforementioned operating modes (the thermal conduction mode and the thermal insulation mode) with specific user scenarios that are adapted for specific operating conditions of the computing device 100. In an example implementation with two operating modes (the thermal conduction mode and the thermal insulation mode), the hinge 102 may utilize a low thermal conductivity material (e.g., 0.02-0.2 W/m-K) such as plastic as a barrier to thermal transfer between the display component 104 and the keyboard component 106. The hinge 102 may utilize a high thermal conductivity material (e.g., 385-400 W/m-K) such as copper (or other metals or alloys thereof) as a path for thermal transfer between the display component 104 and the keyboard component 106.

FIG. 2 is a perspective view of an example computing device 200 incorporating separate, but selectively linked thermal solutions 244, 246 for individual hinged components 204, 206 of the computing device 200. The device 200 is depicted as a laptop computer, however, thermal management hinges 202, 203 may be similarly incorporated within a variety of computing devices, including mobile computing devices and desktop computing devices. For ease of illustration, some external components of the laptop computer are omitted (e.g., a touchpad, a keypad, and a display), while example internal thermal components are shown and described in detail below.

The hinges 202, 203 pivotally connect display component 204 with keyboard component 206 of the device 200. The display component 204 may be separable from the keyboard component 206 so long as the display component 204 is in thermally conductive contact with the hinge 202 when it is connected to the keyboard component 206. While the display component 204 and the keyboard component 206 are illustrated, and discussed in detail herein, the computing device may include any two or more hinged components.

The hinges 202, 203 may take a variety of specific forms, and may incorporate some aspects of a barrel hinge (see hinge 302 of FIG. 3). The hinges 202, 203 have at least two thermal operating modes (e.g., a thermal conduction mode and a thermal insulation mode). However, in some implementations, the hinges 202, 203 includes more than the two operating modes. For example, the hinges 202, 203 may incorporate three or more thermal modes with specific predetermined user scenarios that are adapted for specific operating conditions of the computing device 200.

Each of the keyboard component 206 and the display component 204 may generate heat and dissipate heat. For example, the display component 204 may include one or more printed circuit boards (e.g., PCB 252) with heat-generating components mounted thereon (e.g., GPU 248). The GPU 248 is conductively connected to a display thermal solution 244 (e.g., a heat pipe or sink, heat exchanger, cooling fan, or some combination thereof). Similarly, the keyboard component 206 may include one or more printed circuit boards (e.g., PCB 254) with heat-generating components mounted thereon (e.g., GPU 250). The GPU 250 is conductively connected to a keyboard thermal solution 246 (e.g., a heat pipe or sink, heat exchanger, cooling fan, or some combination thereof).

When the hinges 202, 203 are operating in a thermal insulation mode, the display thermal solution 244 dissipates heat generated within the display component 204 and the keyboard thermal solution 246 dissipates heat generated within the keyboard component 206 with little heat transfer between the display component 204 and the keyboard component 206. When the hinges 202, 203 are operating in a thermal conduction mode, the display thermal solutions 244, 246 are thermally linked and heat is transferred from one of the thermal solutions 244, 246 operating at a higher temperature to the other of the thermal solutions 244, 246 operating at a lower temperature.

FIG. 3 is a perspective view of an example thermal management hinge 302. The hinge 302 is a mechanical bearing that pivotally connects two device components (not shown, see e.g., keyboard components 106, 206 and display components 104, 204 of FIGS. 1 and 2) about a fixed axis of rotation 310. The hinge 302 is illustrated as a barrel hinge, however, other hinge types are contemplated herein.

The hinge 302 has at least two thermal operating modes (e.g., a thermal conduction mode and a thermal insulation mode). In FIG. 3, the hinge 302 is depicted in the thermal conduction mode, as illustrated by thermal transfer arrow 308. The thermal transfer arrow 308 illustrates thermal conduction from a relatively higher temperature component to a relatively lower temperature component via the hinge 302.

The barrel hinge 302 includes two sectional knuckles 312, 314 secured by a pivot pin 320. The knuckles 312, 314 each have a hollow cylindrical shaped portion where the rotational bearing force is applied and a tab portion for attaching the hinge 302 to a component to be pivoted with respect to another component. The pivot pin 320 extends through the knuckles 312, 314, holding the knuckles 312, 314 in line along the axis of rotation 310, but permitting each knuckle to rotate about the axis of rotation 310 with respect to the other knuckle.

In various implementations, the pivot pin 320 is fixed in position with respect to one of the knuckles 312, 314 and the other knuckle is permitted to rotate about the pivot pin 320. This sets an orientation of the pivot pin 320 with respect to at least one of the knuckles 312, 314. In other implementations, the pivot pin 320 floats with regard to both of the knuckles 312, 314.

The knuckles 312, 314 are thermally insulated from one another. In one implementation, an insulating washer or gap 322 is disposed between the knuckles 312, 314 to thermally insulate the knuckles 312, 314. In other implementations, thermally insulating material is used for portions of one or both of the knuckles 312, 314 in contact with an adjacent knuckle to thermally insulate the knuckles 312, 314.

The knuckles 312, 314 are in thermally conductive contact with the pivot pin 320 regardless of a thermal orientation of the pivot pin 320. As a result, heat is transferred from the knuckle 314 to the pivot pin 320, or vice versa, regardless of a thermal orientation of the pivot pin 320. In some instances, one of the knuckles and the pivot pin 320 forms a continuous structure. In other implementations, the knuckles 314, 316 and the pivot pin 320 remain physically separate.

In the thermal conduction mode, the pivot pin 320 is oriented in a position that permits heat to be conducted along a length of the pivot pin 320. As a result, heat may be conducted from the knuckle 314 to the pivot pin 320, along a length of the pivot pin 320, and from the pivot pin 320 to the knuckle 312, and vice versa, as illustrated by the thermal transfer arrow 308.

In the thermal insulation mode, the pivot pin 320 is oriented in a position that prevents heat from being conducted along a length of the pivot pin 320. As a result, heat that is conducted from the knuckle 314 to the pivot pin 320 is not substantially conducted along a length of the pivot pin 320, and vice versa. Thus, the knuckle 312 remains thermally insulated from the knuckle 314.

Actuator 316 selectively rotates the pivot pin 320 to one of two or more predetermined thermal orientations, which affect thermal resistance along a length of the pivot pin 320. For example, in a first thermal orientation, the pivot pin 320 is thermally conductive along substantially its entire length. In a second thermal orientation, the pivot pin 320 is thermally insulating along at least a portion adjacent one or both of the knuckles 312, 314. For additional detail regarding the pivot pin 320, see FIGS. 4A-6B and detailed description below.

In the depicted implementation, the actuator 316 is an electric motor with an output shaft 318 longitudinally connected to the pivot pin 320. The electric motor is selectively operated to turn the output shaft 318 to achieve a desired thermal orientation of the pivot pin 320. Further, electromagnets (e.g., electromagnet 324) may be selectively energized to rotate the pivot pin 320 to a predetermined thermal orientation in addition or in lieu of the actuator 316. In various implementations, the actuator 316 is one of an electric, mechanical, magnetic, hydraulic, and pneumatic actuator.

While two knuckles 312, 314 are depicted in FIG. 3, greater or fewer knuckles may be used depending on the specific implementation. Further, when more than two knuckles are used, additional thermal management modes may be achieved by connecting different numbers of knuckles in thermally conductive contact based on the pivot pin 320 thermal orientation. In still further implementations, the barrel hinge 302 may also incorporate dampening, spring-loading, and/or friction locking features, as desired.

Figure 4A:
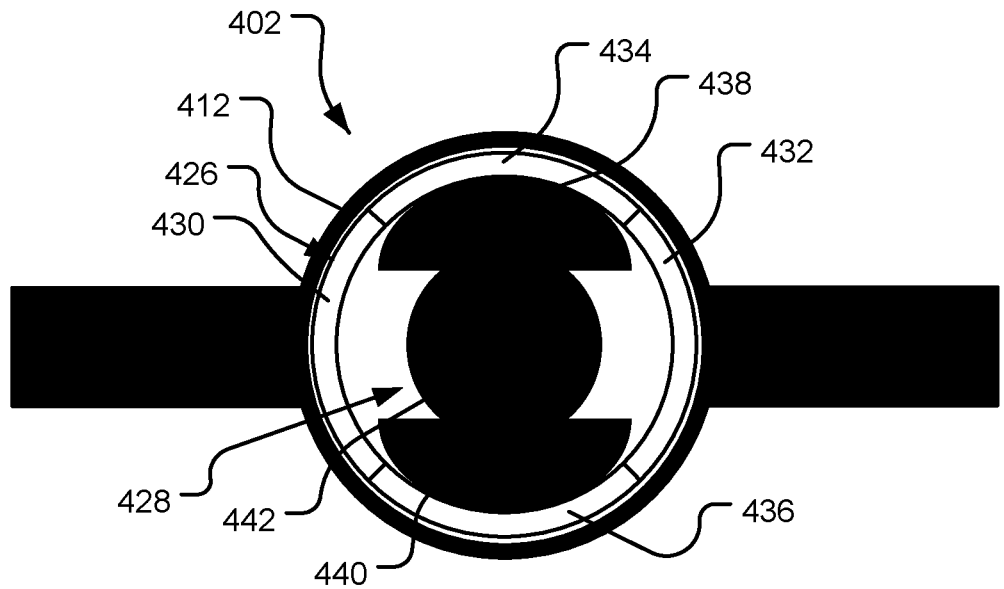
FIG. 4A is a sectional view of a second example thermal management hinge in a thermal insulation orientation.
Figure 4B:
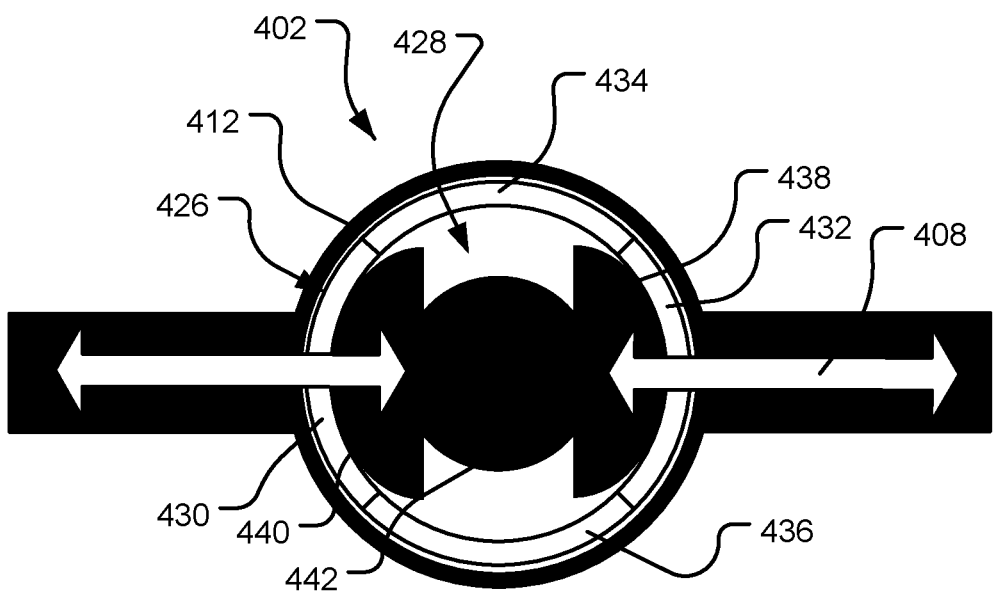
FIG. 4B is a sectional view of the thermal management hinge of FIG. 4A in a thermal conduction orientation.

FIG. 4A is a sectional view of an example thermal management hinge 402 in a thermal insulation orientation. The depicted section is of a knuckle 412 and a pivot pin (collectively an inner pin 428 and an outer pin 426) of a barrel hinge 402. The hinge 402 has at least two distinct thermal operating modes (e.g., a thermal conduction mode and a thermal insulation mode). In FIG. 4A, the hinge 402 is depicted in the thermal insulation mode. In FIG. 4B, the hinge 402 is depicted in the thermal conduction mode, as illustrated by heat transfer arrow 408.

The knuckle 412 is secured by the pivot pin. The knuckle 212 has a hollow cylindrical-shaped portion where the rotational bearing force is applied and a tab portion for attaching the hinge 402 to a component to be pivoted with respect to another component. The pivot pin extends through the knuckle 412 holding the knuckle 412 in line with any other knuckles (see e.g., knuckles 212, 214 of FIG. 2) of the hinge 402, but permitting the knuckle 412 to rotate about the pivot pin.

The pivot pin includes the outer pin 426 (also referred to herein as a first pin portion) and the inner pin 428 (also referred to herein as a second pin portion). The outer pin 426 is a hollow cylinder slip fit longitudinally and concentrically within the knuckle 412. The outer pin 426 includes thermally conductive sections 430, 432 running longitudinally along a length of the pivot pin adjacent the knuckle 412. The outer pin 426 also includes thermally insulating sections 434, 436 running longitudinally along a length of the pivot pin adjacent the knuckle 412.

While two thermally conductive sections 430, 432 and two thermally insulating sections 434, 436 are depicted, any number of thermally conductive sections and thermally insulating sections may be implemented as desired. Further, the thermally conductive sections 430, 432 are depicted on opposing sides of the pivot pin and the thermally insulating sections 434, 436 are as well depicted on different opposing sides of the pivot pin. However, any orientation of the thermally conductive sections and thermally insulating sections on the outer pin 426 may be implemented as desired.

The inner pin 428 runs concentrically through an aperture in the outer pin and includes contacts 438, 440 that extend away from a center portion 442 of the inner pin 428 and selectively contact inner surfaces of the thermally conductive sections 430, 432 or the thermally insulating sections 434, 436 of the outer pin 426, as desired. In FIG. 4A, the contacts 438, 440 are depicted in contact with the thermally insulating sections 434, 436 of the outer pin 426. As such, heat is not readily transferred along a length of the outer pin 426, and in turn from the knuckle 412 to another knuckle, or vice versa. As such, the knuckle 412 is thermally insulated from the at least one other knuckle of the hinge 402. While the inner pin 428 is depicted with a particular shape, the inner pin 428 can have any shape that provides the ability to selectively contact the thermally conductive sections 430, 432 and the thermally insulating sections 434, 436, as desired.

FIG. 4B is a sectional view of the example thermal management hinge 402 of FIG. 4A in a thermal conduction orientation. When the inner pin 428 is rotated to the thermal conduction orientation, the contacts 438, 440 are moved such that they are in contact with the thermally conductive sections 430, 432 of the outer pin 426. As such, heat is readily transferred along a length of the outer pin 426, and in turn from the knuckle 412 to another knuckle, or vice versa, as illustrated by arrow 408. An actuator (not shown, see e.g., actuator 216) is selectively operated to rotate the inner pin 428 with respect to the outer pin 426 to achieve a desired thermal orientation of the pivot pin.

Figure 5:
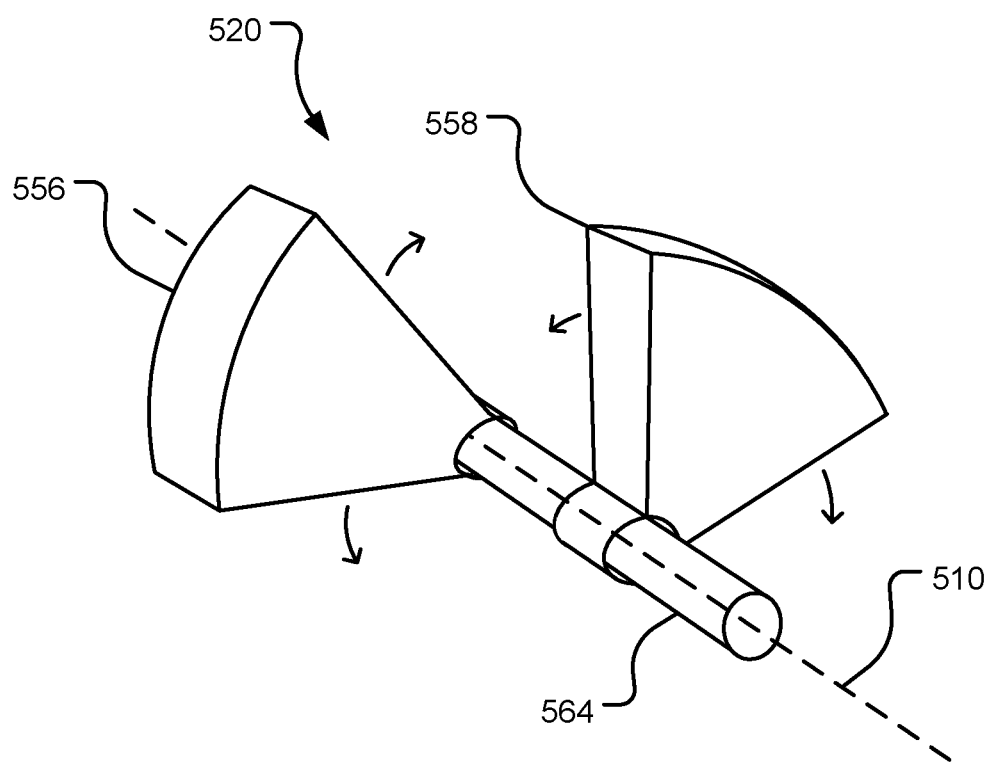
FIG. 5 is a perspective view of an example pivot pin for use in a thermal management hinge.

FIG. 5 is a perspective view of an example pivot pin 520 for use in a thermal management hinge (not shown, see e.g., hinge 302 of FIG. 3). The hinge is a mechanical bearing that pivotally connects two device components (not shown, see e.g., keyboard components 106, 206 and display components 104, 204 of FIGS. 1 and 2) about a fixed axis of rotation 510. The hinge has at least two thermal operating modes (e.g., a thermal conduction mode and a thermal insulation mode) defined by a relative angular position of conductive wedges 556, 558 (also referred to herein as a first pin portion) within the hinge. The hinge may be a barrel hinge; however, other hinge types are contemplated herein.

In a barrel hinge implementation, two sectional knuckles (not shown) are secured by the pivot pin 520. The knuckles each have a hollow cylindrical shaped portion where the rotational bearing force is applied and a conductive tab portion for attaching the hinge to a component to be pivoted with respect to another component. The pivot pin 520 extends through the knuckles holding the knuckles in line along the axis of rotation 510, but permitting each knuckle to rotate about the axis of rotation 510 with respect to the other knuckle. The wedges 556, 558 are selectively rotated about a central shaft 564 (also referred to herein as a second pin portion) to align with respective conductive tab portions of the hinge in a thermal conduction mode. Conversely, the wedges 556, 558 are selectively rotated away from their respective conductive tab portions of the hinge in a thermal insulation mode. In various implementations, the wedges 556, 558 may be individually selectively rotated to any desired orientation.

The knuckles are thermally insulated from one another and selectively in thermally conductive contact with the pivot pin 520. In the thermal conduction mode, the pivot pin 520 is oriented in a position that permits heat to be conducted from a conductive tab portion of a first knuckle, through wedge 556, along a length of the pivot pin 520, through wedge 558, and to a conductive tab portion of a second knuckle, and vice versa. In the thermal insulation mode, the pivot pin 520 is oriented in a position that prevents heat from being conducted from the conductive tab portions to the wedges 556, 558.

One or more actuators (not shown, see e.g., actuator 316 of FIG. 3) selectively rotate the wedges 556, 558 to one of two or more predetermined thermal orientations, which affect thermal resistance between the wedges 556, 558 and the conductive tab portions. For example, electric motors may be selectively operated to turn the wedges 556, 558. Further, electromagnets (not shown, see e.g., electromagnet 324 of FIG. 3) may be selectively energized to rotate the wedges 556, 558. In various implementations, the actuators are one of electric, mechanical, magnetic, hydraulic, and pneumatic actuators.

Figure 6A:
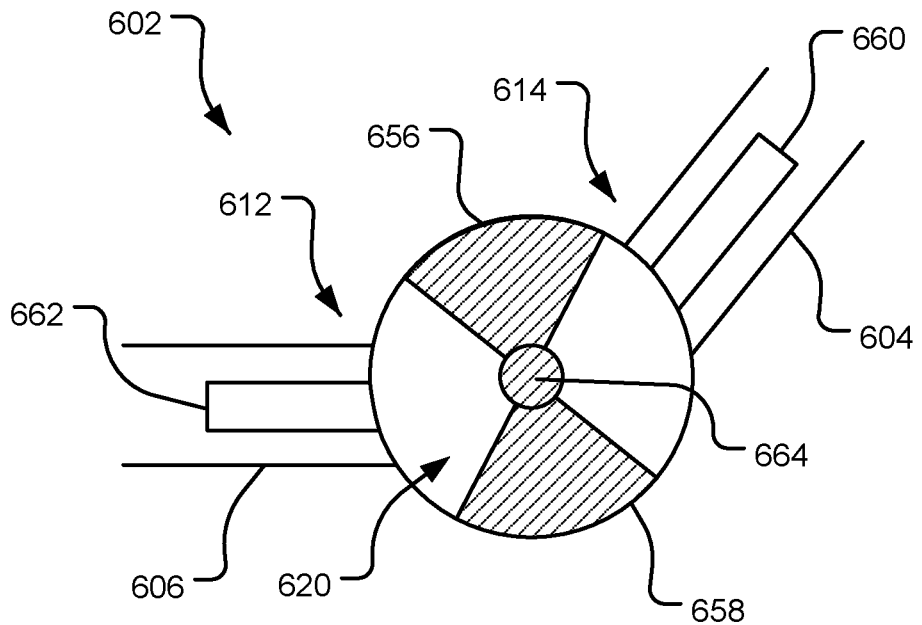
FIG. 6A is a sectional view of a third example thermal management hinge in a thermal insulation orientation.
Figure 6B:
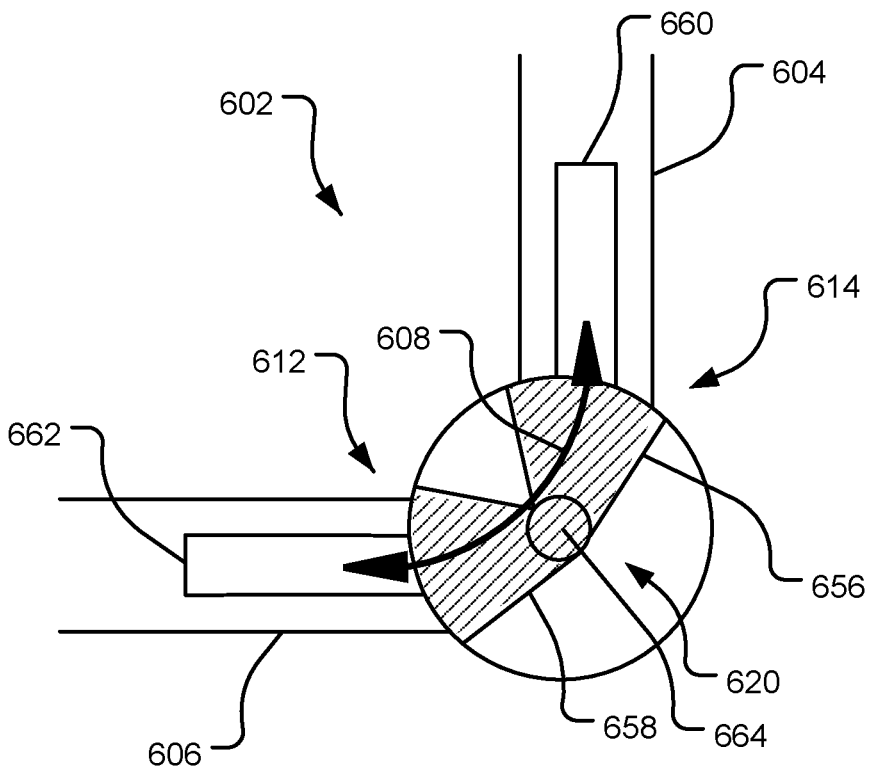
FIG. 6B is a sectional view of the thermal management hinge of FIG. 6A in a thermal conduction orientation.

FIG. 6A is a sectional view of a third example thermal management hinge 602 in a thermal insulation orientation. The depicted section is of knuckles 612, 614 and a pivot pin 620 of a barrel hinge 602. The hinge 602 pivotally connects two device components 604, 606 (e.g., a keyboard component and a display component) about a fixed axis of rotation. The hinge 602 has at least two distinct thermal operating modes (e.g., a thermal conduction mode and a thermal insulation mode). In FIG. 6A, the hinge 602 is depicted in the thermal insulation mode. In FIG. 6B, the hinge 602 is depicted in the thermal conduction mode, as illustrated by thermal transfer arrow 608.

The two sectional knuckles 612, 614 are secured by the pivot pin 620. The knuckles 612, 614 each have a hollow cylindrical shaped portion where the rotational bearing force is applied and a conductive tab portion (conductive tab portions 660, 662) for attaching the hinge 602 to the components 604, 606 to be pivoted with respect to each other. The pivot pin 620 extends through the knuckles 612, 614 holding the knuckles 612, 614 in line along the axis of rotation, but permitting each knuckle to rotate about the axis of rotation with respect to the other knuckle. Wedges 656, 658 (also referred to herein as a first pin portion) are selectively rotated about a central shaft 664 (also referred to herein as a second pin portion) to misalign in thermal insulation mode (as shown in FIG. 6A) or align in thermal conduction mode (as shown in FIG. 6B) with respective conductive tab portions 660, 662 of the hinge 602.

FIG. 6B is a sectional view of the thermal management hinge 602 of FIG. 6A in a thermal conduction orientation. The device components 604, 606 may be independently oriented with respect to each other via hinge 602, while wedges 656, 658 are separately selectively aligned or misaligned with the conductive tab portions 660, 662 of the hinge 602, as shown.

The knuckles 612, 614 are thermally insulated from one another and selectively in thermally conductive contact with the pivot pin 620. In the thermal conduction mode, the pivot pin 620 is oriented in a position that permits heat to be conducted from the conductive tab portion 660, through wedge 656, along a length of the pivot pin 620, through wedge 658, and to the conductive tab portion 662, and vice versa. In the thermal insulation mode, the pivot pin 620 is oriented in a position that prevents heat from being conducted from the conductive tab portions 660, 662 to the wedges 656, 658 (see FIG. 6A).

In various implementations, the wedges 656, 658 may be individually selectively rotated to any desired orientation. One or more actuators (not shown, see e.g., actuator 316 of FIG. 3) selectively rotate the wedges 656, 658 to one of two or more predetermined thermal orientations, which affect thermal resistance between the wedges 656, 658 and the conductive tab portions 660, 662. For example, electric motors may be selectively operated to turn the wedges 656, 658. Further, electromagnets (not shown, see e.g., electromagnet 324 of FIG. 3) may be selectively energized to rotate the wedges 656, 658. In various implementations, the actuators are one of electric, mechanical, magnetic, hydraulic, and pneumatic actuators.

FIG. 7A includes a sectional view of a fourth example thermal management hinge 702 in a thermal insulation orientation. The depicted section is of knuckles 712, 714 and a pivot pin 720 of a barrel hinge 702. The hinge 702 pivotally connects two device components 704, 706 (e.g., a keyboard component and a display component) about a fixed axis of rotation. The hinge 702 has at least two distinct thermal operating modes (e.g., a thermal conduction mode and a thermal insulation mode). In FIG. 7A, the hinge 702 is depicted in the thermal insulation mode. In FIG. 7B, the hinge 702 is depicted in the thermal conduction mode, as illustrated by thermal transfer arrow 708.

The two sectional knuckles 712, 714 are secured by the pivot pin 720. The knuckles 712, 714 each have a hollow cylindrical shaped portion where the rotational bearing force is applied and a conductive tab portion (conductive tab portions 760, 762) for attaching the hinge 702 to the components 704, 706 to be pivoted with respect to each other. The pivot pin 720 extends through the knuckles 712, 714 holding the knuckles 712, 714 in line along the axis of rotation, but permitting each knuckle to rotate about the axis of rotation with respect to the other knuckle.

The conductive tab portions 760, 762 each include an extendible contact (contacts 766, 768, also referred to herein as a first pin portion) that are selectively extended to contact a conductive central shaft 764 (also referred to herein as a second pin portion) in a thermal conduction mode (as shown in FIG. 6B) or retract from the conductive central shaft 764 in thermal insulation mode (as shown in FIG. 6A).

FIG. 7B includes a sectional view of the thermal management hinge of FIG. 7A in a thermal conduction orientation. The device components 704, 706 may be independently oriented with respect to each other via hinge 702, while contacts 766, 768 are separately selectively extended or retracted, as shown.

The knuckles 712, 714 are thermally insulated from one another and selectively in thermally conductive contact with the pivot pin 720. In the thermal conduction mode, the pivot pin 720 is oriented in a position that permits heat to be conducted from the conductive tab portion 760, through contact 766, along a length of the pivot pin 720, through contact 768, and to the conductive tab portion 762, and vice versa. In the thermal insulation mode, the pivot pin 720 is oriented in a position that prevents heat from being conducted from the conductive tab portions 760, 762 to the contacts 766, 768 (see FIG. 7A).

In one implementation, one or more linear actuators (not shown, see e.g., actuator 316 of FIG. 3) selectively extend the contacts 766, 768 to one of two or more predetermined thermal orientations, which affect thermal resistance between the contacts 766, 768 and the conductive tab portions 760, 762. In another implementation, the pivot pin 720 may incorporate a cam and/or a catch-and-release clutch to selectively extend the contacts 766, 768 to the predetermined thermal orientations. For example, electric actuators may be selectively operated to extend the contacts 766, 768. Further, electromagnets (not shown, see e.g., electromagnet 324 of FIG. 3) may be selectively energized to extend the contacts 766, 768. In various implementations, the actuators are one of electric, mechanical, magnetic, hydraulic, and pneumatic actuators.

FIG. 8 is a perspective view of a fifth example thermal management hinge 802. The hinge 802 is a mechanical bearing that pivotally connects two device components (not shown, see e.g., keyboard components 106, 206 and display components 104, 204 of FIGS. 1 and 2) about a fixed axis of rotation 810. The hinge 802 is illustrated as a barrel hinge, however, other hinge types are contemplated herein.

The hinge 802 has at least two thermal operating modes (e.g., a thermal conduction mode and a thermal insulation mode). In FIG. 8, the hinge 802 is depicted in the thermal conduction mode, as illustrated by thermal transfer arrow 808. The thermal transfer arrow 808 illustrates thermal conduction from a relatively higher temperature component to a relatively lower temperature component via the hinge 802.

The barrel hinge 802 includes two sectional knuckles 812, 814 secured by a pivot pin 820. The knuckles 812, 814 each have a hollow cylindrical shaped portion where the rotational bearing force is applied and a tab portion for attaching the hinge 802 to a component to be pivoted with respect to another component. The pivot pin 820 extends through the knuckles 812, 814, holding the knuckles 812, 814 in line along the axis of rotation 810, but permitting each knuckle to rotate about the axis of rotation 810 with respect to the other knuckle.

The pivot pin 820 includes an outer pin 826 (also referred to herein as a first pin portion) and an inner pin 828 (also referred to herein as a second pin portion). The inner pin 828 is a conductive rod and functions as a heat pipe thermally transferring energy along a length of the pivot pin 820. The outer pin 826 has alternating sections of thermally conductive material and thermally insulating material (e.g., thermally conductive section 870, shown with hatching, and thermally insulating section 872), each of which is approximately the same length of the sectional knuckles 812, 814. The knuckles 812, 814 are physically spaced from one another with gap 822 disposed between the knuckles 812, 814. A length of the gap 822 is also approximately the same length of the sectional knuckles 812, 814. The knuckles 812, 814 slide along the pivot pin 820, as illustrated by arrows 874, 876 to contact different areas of the pivot pin 820 depending upon whether a thermally conductive mode or a thermally insulating mode is desired.

In the thermal conduction mode, the pivot pin 820 is oriented in a position that permits heat to be conducted along a length of the pivot pin 820. As a result, heat may be conducted from the knuckle 814 to the outer pin 826 (e.g., via thermally conductive section 870), from the outer pin 826 to the inner pin 828, along a length of the inner pin 828, from the inner pin 828 to the outer pin 826, and from the outer pin 826 to the knuckle 812, and vice versa, as illustrated by the thermal transfer arrow 808. In the thermal insulation mode, the pivot pin 820 is oriented in a position that prevents heat from being conducted along a length of the pivot pin 820. As a result, heat is prevented from being conducted from the knuckles 812, 814 to the outer pin 826 due to contact with the thermally insulating sections (e.g., thermally insulating section 872).

In various implementations, the knuckles 812, 814 may be individually slid to any desired orientation. One or more actuators (not shown, see e.g., actuator 316 of FIG. 3) selectively slide the knuckles 812, 814 to one of two or more predetermined thermal orientations, which affect thermal resistance between the knuckles 812, 814 and the outer pin 826. For example, linear electric actuators may be selectively operated to slide the knuckles 812, 814. Further, electromagnets (not shown, see e.g., electromagnet 324 of FIG. 3) may be selectively energized to slide the knuckles 812, 814. In various implementations, the actuators are one of electric, mechanical, magnetic, hydraulic, and pneumatic actuators.

While two knuckles 812, 814 are depicted in FIG. 8, greater or fewer knuckles may be used depending on the specific implementation. Further, when more than two knuckles are used, additional thermal management modes may be achieved by connecting different numbers of knuckles in thermally conductive contact based on the pivot pin 820 thermal orientation. In still further implementations, the barrel hinge 802 may also incorporate dampening, spring-loading, and/or friction locking features, as desired.

FIG. 9 illustrates example operations 900 for using a thermal management hinge. A detecting operation 905 detects an operating condition of a computing device. The computing device includes a thermal management hinge pivotally connecting at least a first component to a second component of the computing device. The operating condition relates to whether the thermal management hinge should conduct heat between the hinged components of the computing device or thermally insulate the hinged components of the computing device from one another.

The following example implementations reference a two-component computing device including a keyboard component and a touchscreen component. However, other computing devices may have additional or different components.

In a first example implementation, the detecting operation 905 detects that a user is actively using a keyboard, a touchpad, or a touchscreen of the computing device, or that the computing device is resting on the user's lap or against the user's face (collectively referred to herein as a user condition). Active use of the keyboard, the touchpad, or the touchscreen may be detected by monitoring input data from the keyboard, the touchpad, or the touchscreen, using a user-facing camera to monitor the user's active input methods, or using proximity sensors. The computing device resting on the user's lap or against the user's face may also be detected by the user-facing camera or using proximity sensors or attitude sensors, for example.

In a second example implementation, the detecting operation 905 detects that the user is operating one or more specific computing applications on the computing device (referred to herein as an application condition).

In a third example implementation, the detecting operation 905 detects that one or more batteries within the computing device are either fully charged, discharging, or charging (referred to herein as a charging condition). This may be detected by monitoring current flow to or from the battery or batteries.

In a fourth example implementation, the detecting operation 905 detects that a CPU and/or GPU is in active use in one of multiple hinged components of the computing device (referred to herein as a processing unit condition).

In a fifth example implementation, the detecting operation 905 detects that one or both of the hinged components of the computing device are under or over a normal operating temperature range (referred to herein as a thermal condition). Temperature sensors may be placed within each of the hinged components of the computing device to monitor temperatures within the computing device.

In a sixth example implementation, the detecting operation 905 monitors a position of a user selector indicating the user's preference on whether the thermal management hinge is oriented in a thermal conduction mode or a thermal insulation mode (referred to herein as a manual condition). In various implementations, the user selector may take the form of a button, knob, or switch, and may be physically implemented on the computing device or electronically on a display of the computing device. In some cases, the user selector may be styled as a "quiet mode" or a "maximum cooling" selector, which is intended to put the thermal management hinge in a thermal conduction mode.

A comparing operation 910 compares the detected operating condition with a list of preselected scenarios. The list of preselected scenarios is stored in memory of the computing device, or remotely stored and accessed via a computer network. In various implementations, the list of preselected scenarios is stored and accessed as a look-up table.

A first example predetermined scenario (referred to herein as a user scenario) defines that heat is transferred away from an input device the user is actively using or away from a hinged component that is placed adjacent the user (e.g., on the user's lap or against the user's face). More specifically, if the user is actively using a specific input device (e.g., the keyboard, the touchpad, or the touchscreen) of the computing device or a specific hinged component is placed adjacent the user, and the hinged component of the computing device containing the input device or adjacent the user is operating at a higher temperature than another hinged component of the computing device, than the predetermined scenario defines the thermal orientation of the thermal hinge for thermal conduction mode. If the active hinged component is operating at a lower temperature than another hinged component of the computing device, than the predetermined scenario defines the thermal orientation of the thermal hinge for thermal insulation mode. The net result is that the temperature of the hinged component that contains the input device the user is actively using or is placed adjacent the user is maintained at a lower temperature for user comfort.

A second example predetermined scenario (referred to herein as an application scenario) defines that a thermal orientation of the thermal hinge matches that assigned to one or more specific software applications that the user may be actively using. More specifically, if the user is actively using a software program where the user is likely to be primarily using a specific user input device (e.g., a keyboard when running MS Word), and the hinged component of the computing device containing the input device is operating at a higher temperature than another hinged component of the computing device, than the predetermined scenario defines the thermal orientation of the thermal hinge for thermal conduction mode. If the active hinged component is operating at a lower temperature than another hinged component of the computing device, than the predetermined scenario defines the thermal orientation of the thermal hinge for thermal insulation mode. The net result is again that the temperature of the hinged component that contains the input device the user is actively using is maintained at a lower temperature for user comfort. In some implementations, the second predetermined scenario includes a predetermined expected temperature differential between the hinged components of the computing device. In such implementations, the actual temperatures of the hinged components of the computing device are not measured or monitored and a decision on the thermal management mode of the hinge is based on the expected temperature differential.

A third example predetermined scenario (referred to herein as a charging scenario) defines that during battery charging, the thermal hinge is maintained at a thermally conductive orientation to transfer heat away from the charging battery. More specifically, if a battery charging condition is detected, than the predetermined scenario defines the thermal orientation of the thermal hinge for thermal conduction mode. The net result is that the temperature of the hinged component that contains the charging battery is maintained at a lower temperature.

A fourth example predetermined scenario (referred to herein as a processing unit scenario) defines that if a CPU or GPU within one of the hinged components is in active use and the hinged component of the computing device containing the CPU or GPU is operating at a higher temperature than another hinged component of the computing device, than the predetermined scenario defines the thermal orientation of the thermal hinge for thermal conduction mode. If the active hinged component is operating at a lower temperature than another hinged component of the computing device, than the predetermined scenario defines the thermal orientation of the thermal hinge for thermal insulation mode. The net result is that the temperature of the hinged component that contains the CPU or GPU in active use is maintained at a lower temperature.

A fifth example predetermined scenario (referred to herein as a thermal scenario) defines that the hinge is placed in thermal conduction mode when one or both of the hinged components of the computing device are under or over a normal operating temperature range.

A sixth example predetermined scenario (referred to herein as a manual scenario) defines that the hinge is placed in a thermal mode corresponding to a user's selection on a physical or electronic selector.

While several specific predetermined scenarios for operating the thermal management hinge are described in detail above, other predetermined scenarios are contemplated herein to manage thermal conditions within the computing device.

A decision operation 915 determines if the detected operating condition of the computing device matches a preselected scenario that warrants a change in thermal orientation of a thermal management hinge. If the detected operating condition of the computing device fails to match a preselected scenario that warrants a change in thermal orientation of a thermal management hinge, the detecting operation 905 repeats. The detecting operation 905, comparing operation 910, and decision operation 915 may iteratively repeat as the computing device searches for a condition that justifies a change in thermal orientation of the thermal management hinge.

If the decision operation 915 determines that a detected operating condition of the computing device matches a preselected scenario that warrants a change in thermal orientation of a thermal management hinge, a selecting operation 920 selects a thermal orientation corresponding to the matched preselected scenario. In some implementations, the selected thermal orientation is one of the thermally conductive and the thermally insulating orientations discussed in detail above. In other implementations, the thermal orientation is selected from a list of two or more thermal orientations corresponding to specific user scenarios.

A changing operation 925 correspondingly changes the thermal orientation of the thermal management hinge if it differs from a current thermal orientation of the thermal management hinge. The thermal orientation of the thermal management hinge controls thermal resistance between hinged components of the computing device and the thermal management hinge has at least two thermal operating modes (e.g., a thermal conduction mode and a thermal insulation mode).

In some implementations, the thermal management hinge incorporates a form factor as depicted in FIGS. 3-8, and described in detail above. For example, the changing operation 925 may trigger a motorized electric actuator and/or an electromagnetic actuator to change a position of an inner pin with respect to an outer pin of a hinge pin of the thermal management hinge. This change in position affects the thermal resistance of the hinge pin along a length of the hinge pin, which in turn affects thermal resistance between knuckles of the thermal management hinge with a barrel hinge form factor. Other hinge form factors are contemplated herein and the operations 900 are not intended to be limited to a specific barrel hinge application.

FIG. 10 illustrates an example processing system 1000 for use in controlling a thermal management hinge 1001. The processing system 1000 may include one or more processor units 1002 (discrete or integrated microelectronic chips and/or separate but integrated processor cores), at least one memory device 1004 (which may be integrated into systems or chips of the processing system 1000), a display 1006 (e.g., a touchscreen display, an OLED display with photodetectors, etc.), and other interfaces 1008 (e.g., keyboard and/or touchpad interfaces). The memory device 1004 generally includes both volatile memory (e.g., RAM) and non-volatile memory (e.g., flash memory). An operating system 1010, such as one of the varieties of the Microsoft Windows® operating system, resides in the memory device 1004 and is executed by at least one of the processor units 1002, although other operating systems may be employed.

One or more applications 1012 (e.g., a thermal management hinge application) are loaded in the memory device(s) 1004 and executed on the operating system 1010 by at least one of the processor units 1002. The processing system 1000 includes a power supply 1016, which is powered by one or more batteries and/or other power sources, and which provides power to other components of the processing system 1000. The power supply 1016 may also be connected to an external power source that overrides or recharges the built-in batteries or other power sources.

The processing system 1000 also includes one or more communication transceivers 1030 to provide network connectivity (e.g., mobile phone network, Wi-Fi®, BlueTooth®, etc.) and various other components. Such components may include a positioning system 1020 (e.g., a global positioning satellite transceiver), one or more sensors 1022 (e.g., temperature sensors, attitude sensors, accelerometers, etc.), one or more cameras 1024, one or more audio interfaces 1034 (e.g., a microphone, an audio amplifier and speaker, and an audio jack), one or more antennas 1032, and additional storage 1028. Other configurations may also be employed.

In an example implementation, one or more components of the processing system 1000 are used as inputs for detecting an operating condition of a computing device. Further, a list of preselected scenarios is stored within the memory device(s) 1004 or the storage 1028. The thermal management hinge application executed by the operating system 1010 compares the detected operating condition(s) with the list of preselected scenarios to determine if a change in thermal orientation of the thermal management hinge 1001 is warranted. If so, the operating system 1010 operates actuator 1003 to physically change the thermal orientation of the thermal management hinge 1001 per one of the preselected scenarios.

The processing system 1000 may include a variety of tangible computer-readable storage media and intangible computer-readable communication signals. Tangible computer-readable storage can be embodied by any available media that can be accessed by the processing system 1000 and includes both volatile and nonvolatile storage media, as well as removable and non-removable storage media. Tangible computer-readable storage media excludes intangible communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing system 1000. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (APIs), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, the logical operations may be performed in any order, adding or omitting operations as desired, unless explicitly claimed otherwise or a specific order is inherently necessitated by the claim language.

An example thermal management hinge according to the presently disclosed technology includes a first thermally conductive knuckle, a second thermally conductive knuckle, a first pin portion, and a second pin portion. One or both of the first pin portion and the second pin portion change physical orientation within the hinge to vary thermal resistance between the first knuckle and the second knuckle.

In another example thermal management hinge according to the presently disclosed technology, the first pin portion includes one or more conductive wedges, and the second pin portion includes a central shaft. The conductive wedges selectively rotate about the central shaft to physically contact different areas of the first knuckle and the second knuckle.

In another example thermal management hinge according to the presently disclosed technology, the first pin portion includes one or more conductive contacts, and the second pin portion includes a central shaft. The conductive contacts selectively extend to physically contact the central shaft.

In another example thermal management hinge according to the presently disclosed technology, the first pin portion is an outer pin incorporating a thermally conductive section and a thermally insulating section and the second pin portion is a thermally conductive inner pin. One or both of the first knuckle and the second knuckle selectively slide along the outer pin to physically contact different areas of the thermally conductive section and the thermally insulating section of the outer pin depending on a linear position of one or both of the first knuckle and the second knuckle with respect to the outer pin.

In another example thermal management hinge according to the presently disclosed technology, the first pin portion is an outer pin incorporating a thermally conductive section and a thermally insulating section and the second pin portion is a thermally conductive inner pin. The inner pin selectively rotates within the outer pin to physically contact different areas of the thermally conductive section and the thermally insulating section of the outer pin depending on a rotational orientation of the inner pin with respect to the outer pin.

In another example thermal management hinge according to the presently disclosed technology, the second pin portion extends through the first pin portion and the first pin portion extends through the first knuckle and the second knuckle.

In another example thermal management hinge according to the presently disclosed technology, a rate of thermal transfer between the first knuckle and the second knuckle varies depending on the physical orientation of one or both of the first pin portion and the second pin portion with respect to one or both of the first knuckle and the second knuckle.

Another example thermal management hinge according to the presently disclosed technology further includes an actuator to rotate the first pin portion with respect to the second pin portion.

In another example thermal management hinge according to the presently disclosed technology, the actuator is one of an electric, mechanical, magnetic, hydraulic, and pneumatic actuator.

Another example thermal management hinge according to the presently disclosed technology further includes an actuator to extend the first pin portion with respect to the second pin portion.

An example method of using a thermal management hinge of a computing device according to the presently disclosed technology includes detecting an operating condition of the computing device, comparing the operating condition with a list of preselected scenarios, and changing a thermal orientation of the thermal management hinge when the operating condition matches a preselected scenario from the list of preselected scenarios.

In another example method of using a thermal management hinge of a computing device according to the presently disclosed technology, the changing operation includes rotating one or more conductive wedges about a central shaft to physically contact different areas of a first knuckle and a second knuckle of the thermal management hinge.

In another example method of using a thermal management hinge of a computing device according to the presently disclosed technology, the changing operation includes extending one or more conductive contacts to physically contact a central shaft of the thermal management hinge.

In another example method of using a thermal management hinge of a computing device according to the presently disclosed technology, the changing operation includes sliding one or both of a first thermally conductive knuckle and a second thermally conductive knuckle along a thermally conductive inner pin and an outer pin to physically contact different areas of a thermally conductive section and a thermally insulating section of the outer pin depending on a linear position of one or both of the first knuckle and the second knuckle with respect to the outer pin of the thermal management hinge.

In another example method of using a thermal management hinge of a computing device according to the presently disclosed technology, the changing operation includes rotating an inner pin with respect to an outer pin to physically contact different areas of a thermally conductive section and a thermally insulating section of the outer pin of the thermal management hinge.

In another example method of using a thermal management hinge of a computing device according to the presently disclosed technology, the changing operation affects a rate of thermal transfer between one or more knuckles of the thermal management hinge.

In another example method of using a thermal management hinge of a computing device according to the presently disclosed technology, the operating condition includes one or more of a user condition, an application condition, a charging condition, a processing unit condition, a thermal condition, and a manual condition.

In another example method of using a thermal management hinge of a computing device according to the presently disclosed technology, the preselected scenarios include one or more of a user scenario, an application scenario, a charging scenario, a processing unit scenario, a thermal scenario, and a manual scenario.

Another example method of using a thermal management hinge of a computing device according to the presently disclosed technology further includes selecting the thermal orientation from a set of two or more predefined thermal orientations.

Another example computing device according to the presently disclosed technology includes a first hinged component, a second hinged component, and a thermal management hinge pivotally connecting the first hinged component to the second hinged component. The thermal management hinge includes a first thermally conductive knuckle, a second thermally conductive knuckle, a first pin portion, a second pin portion, and an actuator to selectively change a physical orientation of one or both of the first pin portion and the second pin portion within the hinge to vary thermal resistance between the first knuckle and the second knuckle of the hinge.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A thermal management hinge comprising:
   a first thermally conductive knuckle;
   a second thermally conductive knuckle;
   a first pin portion; and
   a second pin portion physically separate from the first pin portion, wherein the first pin portion and the second pin portion collectively include a radial arrangement of thermally conductive sections, the first pin portion to change physical orientation with reference to the second pin portion to selectively connect the first knuckle to the second knuckle via the thermally conductive sections within the hinge to vary thermal resistance between the first knuckle and the second knuckle.

2. The thermal management hinge of claim 1, wherein the first pin portion includes one or more conductive wedges as the thermally conductive sections, and the second pin portion includes a central shaft as another of the thermally conductive sections, the conductive wedges to selectively rotate about the central shaft to physically contact different areas of the first knuckle and the second knuckle.

3. The thermal management hinge of claim 1, wherein the first pin portion includes one or more conductive contacts as the thermally conductive sections, and the second pin portion includes a central shaft as another of the thermally conductive sections, the conductive contacts to selectively extend to physically contact the central shaft.

4. The thermal management hinge of claim 1, wherein the first pin portion is an outer pin incorporating one of the thermally conductive sections and a thermally insulating section, and wherein the second pin portion is a thermally conductive inner pin as another of the thermally conductive sections, the inner pin to selectively rotate within the outer pin to physically contact different areas of the thermally conductive section and the thermally insulating section of the outer pin depending on a rotational orientation of the inner pin with respect to the outer pin.

5. The thermal management hinge of claim 1, wherein the second pin portion extends through the first pin portion and the first pin portion extends through the first knuckle and the second knuckle.

6. The thermal management hinge of claim 1, wherein a rate of thermal transfer between the first knuckle and the second knuckle varies depending on the physical orientation of one or both of the first pin portion and the second pin portion with respect to one or both of the first knuckle and the second knuckle.

7. The thermal management hinge of claim 1, further comprising:
   an actuator to rotate the first pin portion with respect to the second pin portion.

8. The thermal management hinge of claim 7, wherein the actuator is one of an electric, mechanical, magnetic, hydraulic, and pneumatic actuator.

9. The thermal management hinge of claim 1, further comprising:
   an actuator to extend the first pin portion with respect to the second pin portion.

10. A method of using a thermal management hinge of a computing device comprising:
    detecting an operating condition of the computing device;
    comparing the operating condition with a list of preselected scenarios; and
    changing a thermal orientation of the thermal management hinge by changing a physical orientation of a first pin portion with reference to a physically separate second pin portion, wherein the first pin portion and the second pin portion collectively include a radial arrangement of thermally conductive sections, the changing operation to selectively connect a first thermally conductive knuckle to a second thermally conductive knuckle via the thermally conductive sections within the hinge to vary thermal resistance between the first knuckle and the second knuckle of the hinge, when the operating condition matches a preselected scenario from the list of preselected scenarios.

11. The method of claim 10, wherein the changing operation includes rotating one or more conductive wedges as the thermally conductive sections about a central shaft as another of the thermally conductive sections to physically contact different areas of a first knuckle and a second knuckle of the thermal management hinge.

12. The method of claim 10, wherein the changing operation includes extending one or more conductive contacts as the thermally conductive sections to physically contact a central shaft as another of the thermally conductive sections of the thermal management hinge.

13. The method of claim 10, wherein the changing operation includes rotating an inner pin as one of the thermally conductive sections with respect to an outer pin incorporating another of the thermally conductive sections to physically contact different areas of the thermally conductive section and a thermally insulating section of the outer pin of the thermal management hinge.

14. The method of claim 10, wherein the changing operation affects a rate of thermal transfer between one or more knuckles of the thermal management hinge.

15. The method of claim 10, wherein the operating condition includes one or more of a user condition, an application condition, a charging condition, a processing unit condition, a thermal condition, and a manual condition.

16. The method of claim 10, wherein the preselected scenarios include one or more of a user scenario, an application scenario, a charging scenario, a processing unit scenario, a thermal scenario, and a manual scenario.

17. The method of claim 10, further comprising:
    selecting the thermal orientation from a set of two or more predefined thermal orientations.

18. A computing device comprising:
    a first hinged component;
    a second hinged component; and
    a thermal management hinge pivotally connecting the first hinged component to the second hinged component, the thermal management hinge including:
    a first thermally conductive knuckle;
    a second thermally conductive knuckle;
    a first pin portion;
    a second pin portion physically separate from the first pin portion, wherein the first pin portion and the second pin portion collectively include a radial arrangement of thermally conductive sections; and
    an actuator to selectively change a physical orientation of the first pin portion with reference to the second pin portion to selectively connect the first knuckle to the second knuckle via the thermally conductive sections within the hinge to vary thermal resistance between the first knuckle and the second knuckle of the hinge.

* * * * *